(12) United States Patent
Jöngren

(10) Patent No.: US 8,155,103 B2
(45) Date of Patent: Apr. 10, 2012

(54) SUPPORT FOR RETRANSMITTING A TRANSPORT BLOCK WITH A DIFFERENT NUMBER OF LAYERS THAN A PREVIOUS TRANSMISSION ATTEMPT

(75) Inventor: George Jöngren, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/991,355

(22) PCT Filed: May 5, 2009

(86) PCT No.: PCT/IB2009/005492
§ 371 (c)(1),
(2), (4) Date: Jan. 31, 2011

(87) PCT Pub. No.: WO2009/136256
PCT Pub. Date: Nov. 12, 2009

(65) Prior Publication Data
US 2011/0116448 A1    May 19, 2011

Related U.S. Application Data

(60) Provisional application No. 61/050,290, filed on May 5, 2008.

(51) Int. Cl.
*H04B 7/212* (2006.01)
(52) U.S. Cl. .................................. 370/348; 370/443
(58) Field of Classification Search .................. None
See application file for complete search history.

(56) References Cited

U.S. PATENT DOCUMENTS 7,289,452 B2 * 10/2007 Malkamaki .................. 370/252
7,809,074 B2 * 10/2010 Kotecha et al. ............... 375/267

FOREIGN PATENT DOCUMENTS
EP     1 944 896 A    7/2008

OTHER PUBLICATIONS

Ericsson et al: "Refinements on Signalling of COI/Precoding Information on PDCCH" 3GPP Draft; RI-081682, 3rd Generation Partnership Project (3GPP), Mobile Competence Centre, 650, Route Des Lucioles, F-06921 Sophia-Antipolis Cedex, France, vol. RAN WGI, No. Shenzhen, China; Apr. 9, 2008, XP050II0068 [retrieved on Apr. 9, 2008] the whole document.

(Continued)

*Primary Examiner* — Kwang B Yao
*Assistant Examiner* — Alex Skripnikov

(57) ABSTRACT

A method of conveying transport block size (TBS) information includes determining TBS parameters for a wireless transmission of data between a first node and a second node based on a first number of transmission layers associated with the wireless transmission. The method also includes generating a control message indicating the TBS parameters and transmitting the control message to the second node. The method also includes transmitting a transport block to the second node in accordance with the TBS parameters indicated by the control message. The transport block is transmitted over a first number of transmission layers. The method also includes retransmitting the transport block to the second node in accordance with the TBS parameters indicated by the control message. The transport block is retransmitted over a second number of transmission layers that differs from the first number of transmission layers.

16 Claims, 6 Drawing Sheets

OTHER PUBLICATIONS

Ericsson: "MIMO Related DL Control Signalling" 3GPP Draft; R1-074844, 3rd Generation Partnership Project (3GPP), Mobile Competence Centre ; 650, Route Des Lucioles ; F-06921 Sophia-Antipolis Cedex ; France, vol. RAN WG1, No. Korea; Oct. 31, 2007, XP050108302 [retrieved on Oct. 31, 2007] _Sections 3 and 4.

Panasonic: "PDCCH transport block signaling" 3GPP Draft; R1-081196, 3rd Generation Partnership Project (3GPP), Mobile Competence Centre ; 650, Route Des Lucioles ; F-06921 Sophia-Antipolis Cedex ; France, vol. RAN WG1, No. Shenzhen, China; Apr. 9, 2008, XP050109642 [retrieved on Apr. 9, 2008] Sections 2, 3, 3.1, 3.2 Table Al.

* cited by examiner

SUPPORT FOR RETRANSMITTING A TRANSPORT BLOCK WITH A DIFFERENT NUMBER OF LAYERS THAN A PREVIOUS TRANSMISSION ATTEMPT

This application claims the benefit of U.S. Provisional Application No. 61/050,290, filed May 5, 2008, the disclosure of which is fully incorporated herein by reference.

TECHNICAL FIELD

The present invention is related to a first node of conveying transport block size (TBS) information in a control message to a second node. The control message contains information describing properties of an associated wireless data transmission between the first and the second node employing spatial multiplexing for sending transport blocks in the wireless data transmission. (As used herein, references to the "present invention" or "invention" relate to exemplary embodiments and not necessarily to every embodiment encompassed by the appended claims.) More specifically, the present invention is related to a first node of conveying transport block size (TBS) information in a control message to a second node. The control message contains information describing properties of an associated wireless data transmission between the first and the second node employing spatial multiplexing for sending transport blocks in the wireless data transmission where TBS parameters are determined to be included in the control message to the second node, the control message is encoded and sent to the second node, and the transport block is sent in the wireless data transmission according to the TBS parameters in the control message.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Multi-antenna techniques can significantly increase the data rates and reliability of a wireless communication system. The performance is in particular improved if both the transmitter and the receiver are equipped with multiple antennas. This results in a multiple-input multiple-output (MIMO) communication channel and such systems and/or related techniques are commonly referred to as MIMO.

The LTE standard is currently under development. A core component in LTE is the support of MIMO antenna deployments and MIMO related techniques. A current working assumption in LTE is the support of a spatial multiplexing mode with possibly channel dependent precoding. The spatial multiplexing mode is aimed for high data rates in favorable channel conditions. An illustration of the spatial multiplexing mode is provided in FIG. 1.

As seen, the information carrying symbol vectors s is multiplied by an $N_T \times r$ precoder matrix $W_{N_T \times r}$. The matrix is often chosen to match the characteristics of the $N_R \times N_T$ MIMO channel H. The r symbols in s each correspond to a layer and r is referred to as the transmission rank. LTE uses OFDM and hence the received $N_R \times 1$ vector $y_k$ for a certain resource element on subcarrier k (or alternatively data resource element number k), assuming no inter-cell interference, is thus modeled by $$y_k = H W_{N_T \times r} s_k + e_k \qquad (1)$$

where $e_k$ is a noise vector obtained as realizations of a random process.

The UE may, based on channel measurements in the forward link, transmit recommendations to the base station of a suitable precoder to use. A single precoder that is supposed to cover a large bandwidth (wideband precoding) may be fed back. It may also be beneficial to match the frequency variations of the channel and instead feedback a frequency-selective precoding report, e.g. several precoders, one per subband.

Channel dependent precoding as above typically requires substantial signaling support, particularly for frequency-selective precoding. Not only is feedback signaling in the reverse link, as mentioned previously, needed, but typically also signaling in the forward link is required to indicate which precoder was actually used in the forward link transmission since the forward link transmitter might not be certain that it obtained a correct precoder report from the (forward link) receiver.

One way of reducing the signaling overhead in the forward link is to signal some kind of precoder confirmation, e.g., whether the transmitter used the same precoders as fed back by the receiver or not. A single bit could be used for this purpose; a value of 1 could mean that the transmitter follows the feedback information slavishly while a value of 0 could mean that instead another, possibly fixed precoder is used. The value zero would for example be used if the feedback information could not be correctly decoded at the transmitter. Obviously, all this assumes decoding errors in the feedback information can be detected, so the feedback information has to be coded accordingly, e.g. including a CRC. An alternative to a fixed precoder is to also signal a single "wideband" precoder. Several variants of precoder report verification schemes have been proposed and is also to be found in this disclosure. Compared with explicitly signaling the frequency-selective precoding report in the forward link, verification approaches can substantially reduce the signaling overhead in the forward link.

The encoded bits, or modulated symbols, originating from the same block of information bits (transport block) is referred to as a codeword. This is also the terminology used in LTE to describe the output from a single HARQ process serving a particular transport block and comprises turbo encoding, rate matching, interleaving etc. The codeword is then modulated and distributed over the antennas. It may make sense to transmit data from several codewords at once, also known as multi-codeword transmission. The first (modulated) codeword may for instance be mapped to the first two antennas and the second codeword to the two remaining antennas in a four transmit antenna system. In the above context of precoding, the codewords are mapped to layers instead of directly to the antennas.

In the field of high rate multi-antenna transmission, one of the most important characteristics of the channel conditions is the so-called channel rank. Roughly speaking, the channel rank can vary from one up to the minimum number of transmit and receive antennas. Taking a 4×2 system as an example, i.e., a system with four transmit antennas and two receive antennas, the maximum channel rank is two. The channel rank varies in time as the fast fading alters the channel coefficients. Moreover, it determines how many layers, and ultimately also codewords, can be successfully transmitted simultaneously. Hence, if the channel rank is one at the instant of transmission of two codewords mapping to two separate layers, there is a strong likelihood that the two signals corresponding to the codewords will interfere so much that both of the codewords are erroneously detected at the receiver.

In conjunction with precoding, adapting the transmission to the channel rank involves using as many layers as the channel rank. In the simplest of cases, each layer would correspond to a particular antenna. But the number of codewords may differ from the number of layers, as in LTE. The issue then arises of how to map the codewords to the layers. Taking the current working assumption for the 4 transmit antenna case in LTE as an example, the maximum number of codewords is limited to two while up to four layers can be transmitted. A fixed rank dependent mapping according to FIG. 2 is used, although there have also been suggestions to include an additional mapping corresponding to mapping a single codeword to two layers.

A substantial amount of MIMO related information needs to be signaled in the forward link to support precoding with dynamic transmission rank adaptation. Taking LTE as an example, the physical downlink control channel (PDCCH) for the support of MIMO (Format 2) is currently proposed to contain the elements listed in Table 1. The fields marked with "(=MIMO)" in green contain MIMO related information. As seen, 16 bits are used for MIMO information, out of which 8 bits are related to precoding:

TABLE 1

Contents of PDCCH format 2 in LTE.

| | PDCCH Field | #bits |
|---|---|---|
| | Resource allocation | System bandwidth dependent |
| | Transmitter power control | 2 |
| | Transport block size (TBS) for codeword 1: TBS1 | 5 |
| | TBS for codeword 2: TBS2 (=MIMO) | 5 |
| | New data indicator (NDI) and redundancy version (RV) for codeword 1 | 3 |
| | NDI and RV for codeword 2 (=MIMO) | 3 |
| | HARQ process ID | 3 |
| Precoding info | Precoder matrix information (PMI) (=MIMO) | 4 |
| | Precoder confirmation (=MIMO) | 1 |
| | Transmission rank: rank indicator (RI) (=MIMO) | 2 |
| | HARQ swap flag (=MIMO) | 1 |

Jointly Encoded Signaling of Precoder Related Information in the Forward Link

Another proposal on how to encode the TBS values and the precoder related information on the PDCCH in LTE for the 4 Tx case is as follows.
TBS Values:
 The TBS values for the two codewords determine the interpretation of the precoder information bits
 The TBS value pair (TBS1, TBS2) for the two codewords thus signals the following:
 (TBS, 0): One codeword transmitted (with size TBS)
 (TBS1, TBS2): Two codewords transmitted
Precoder Information Bits:
 Interpretation depends on (TBS1, TBS2)
 Support of transmission rank override for precoder confirmation (support of frequency-selective precoding)
 Override by using specified columns of all recommended precoders in the latest obtained precoder report conveyed from the receiver
 RI, PMI and precoder confirmation jointly encoded as specified in Table 2 and Table 3.
 Note: 1 codeword, RI=2 for 4 Tx corresponds to transmitting one codeword on layer 0 and 1.
 Note: For 4 Tx in Table 2, the precoder column subset is implicitly know via the codeword to layer mappings in FIG. 2.

TABLE 2

PDCCH for 4 Tx MIMO. The TBS entries point out the number of codewords and determine the interpretation of the precoder information, which is jointly encoded as shown below.

| | Total #messages for precoding info | #messages | Message |
|---|---|---|---|
| 1 codeword: (TBS, 0) | 34 | 16 + 1 | RI = 1: PMI = 0, 1, . . . , 15 RI = 1: Precoder report confirmed, use the precoder indicated by the reported PMI index for each precoder report |
| | | 16 + 1 | RI = 2: PMI = 0, 1, . . . , 15 RI = 2: Precoder report confirmed, use the precoder indicated by the reported PMI index for each precoder report |
| 2 codewords: (TBS1, TBS2) | 51 | 16 + 1 | RI = 2: PMI = 0, 1, . . . , 15 RI = 2: Precoder report confirmed, use the precoder indicated by the reported PMI index for each precoder report |
| | | 16 + 1 | RI = 3: PMI = 0, 1, . . . , 15 RI = 3: Precoder report confirmed, use the precoder indicated by the reported PMI index for each precoder report |

Problems with Existing Solutions

For spatial multiplexing on 4 antenna ports, a single transport block can be mapped to two layers, depending on the transmission rank. For retransmissions of the transport block, it might be necessary to use a different transmission rank than what was used for the first transmission. This might occur when the channel rank for the retransmission instant has changed relative to the first transmission or if there is no data in the buffers for a second codeword. In any case, a possible consequence is that the same transport block needs to be retransmitted with a number of layers different from the number of layers used in the first or a previous transmission.

One of the open issues with the existing way of signaling TBS values in the forward link as exemplified by Table 1 and the approach related to Table 2 is how to perform retransmissions of transport blocks which need to be mapped to a different number of layers for succeeding retransmissions. Obviously, for a retransmission, the TBS value must be the same as for the previous transmissions since the number of information bits in the transport block does not change. But to save signaling overhead, the set of possible TBS values typically depend on the number of layers. This means it may not always be possible to retransmit with a different number of layers or there are substantial limitations which transport formats are supported for the given TBS value. Such problems are for example present in existing solutions, which use separate TBS tables for single-layer and dual-layer transport blocks, tables that only have partial overlap with respect to TBS values to support retransmissions with a varying number of layers.

SUMMARY

The present invention pertains to a first node of conveying transport block size (TBS) information in a control message to a second node. The control message contains information describing properties of an associated wireless data transmission between the first and the second node employing spatial multiplexing for sending transport blocks in the wireless data transmission. The first node comprises a processing unit which determines TBS parameters to be included in the control message to the second node, and encodes the control message. The first node comprises a network interface which sends the control message to the second node, and sends the transport block in the wireless data transmission according to the TBS parameters in the control message.

The present invention pertains to a method in a first node of conveying transport block size (TBS) information in a control message to a second node. The control message contains information describing properties of an associated wireless data transmission between the first and the second node employing spatial multiplexing for sending transport blocks in the wireless data transmission. The method comprises the steps of determining TBS parameters to be included in the control message to the second node. There is the step of encoding the control message. There is the step of sending the control message to the second node. There is the step of sending the transport block in the wireless data transmission according to the TBS parameters in the control message.

The present invention pertains to a second node which receives transport block size (TBS) information in a control message from a first node. The control message contains information describing properties of an associated wireless data transmission between the first and the second node employing spatial multiplexing for receiving transport blocks in said wireless data transmission. The second node comprises a network interface which receives said control message from the first node and said transport block in said wireless data transmission according to said TBS parameters in said control message. The second node comprises a processing unit which decodes said control message.

The present invention pertains to a method in a second node of receiving transport block size (TBS) information in a control message from a first node. The control message contains information describing properties of an associated wireless data transmission between the first and the second node employing spatial multiplexing for receiving transport blocks in said wireless data transmission. The method comprises the steps of receiving said control message from the first node. There is the step of decoding said control message. There is the step of receiving said transport block in said wireless data transmission according to said TBS parameters in said control message.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
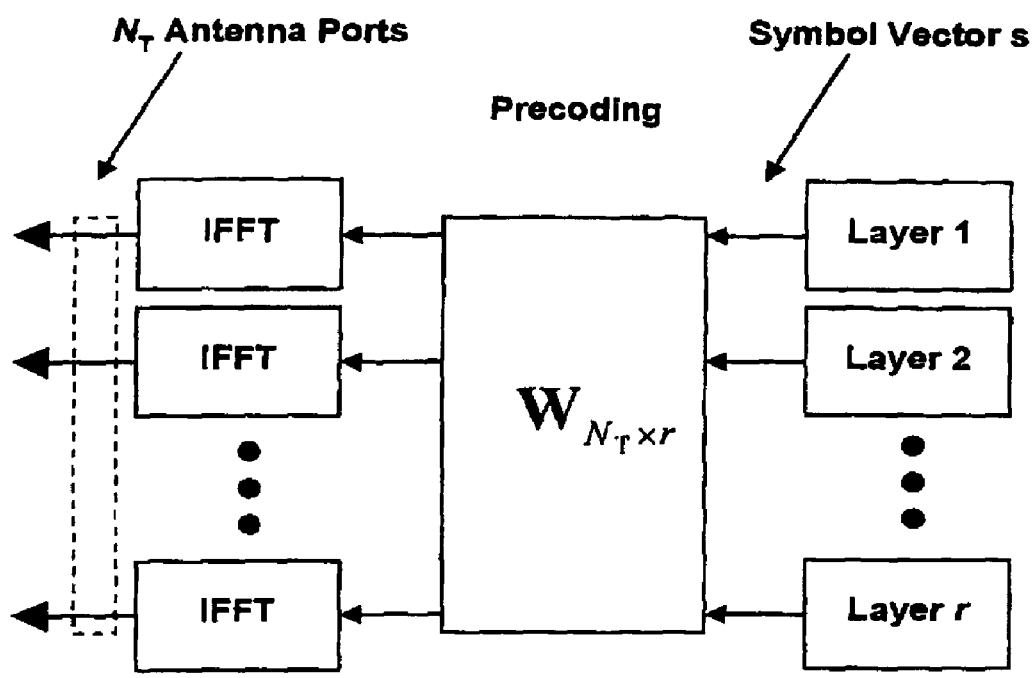
FIG. 1 is a transmission structure of precoded spatial multiplexing mode in LTE.
Figure 2:
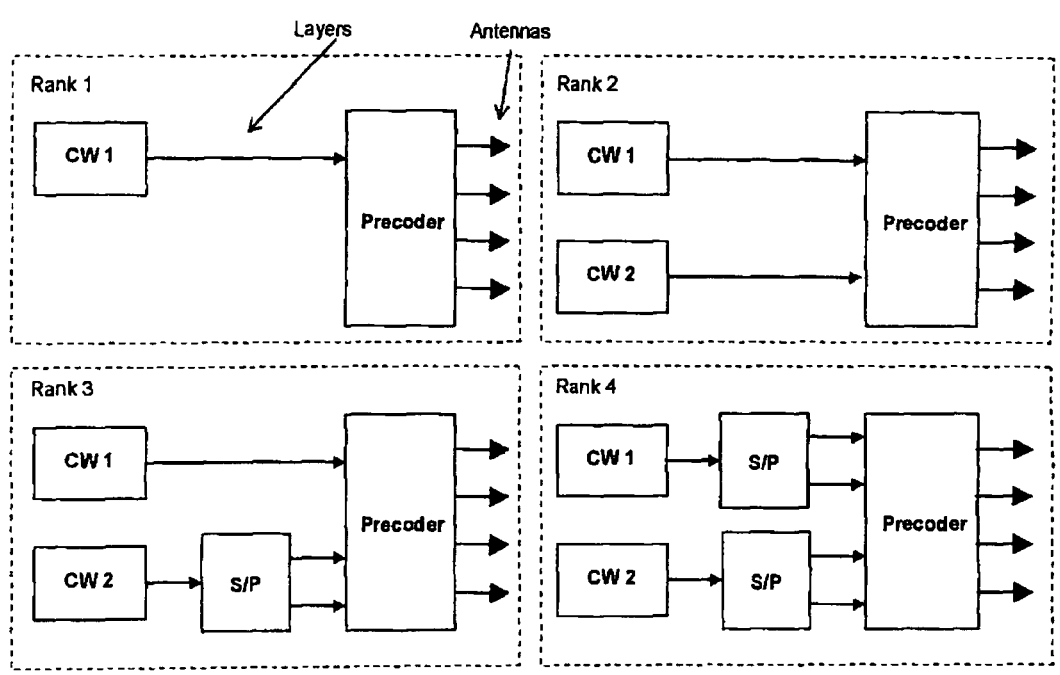
FIG. 2 is codeword to layer mapping for four antenna system with precoding.
Figure 3:
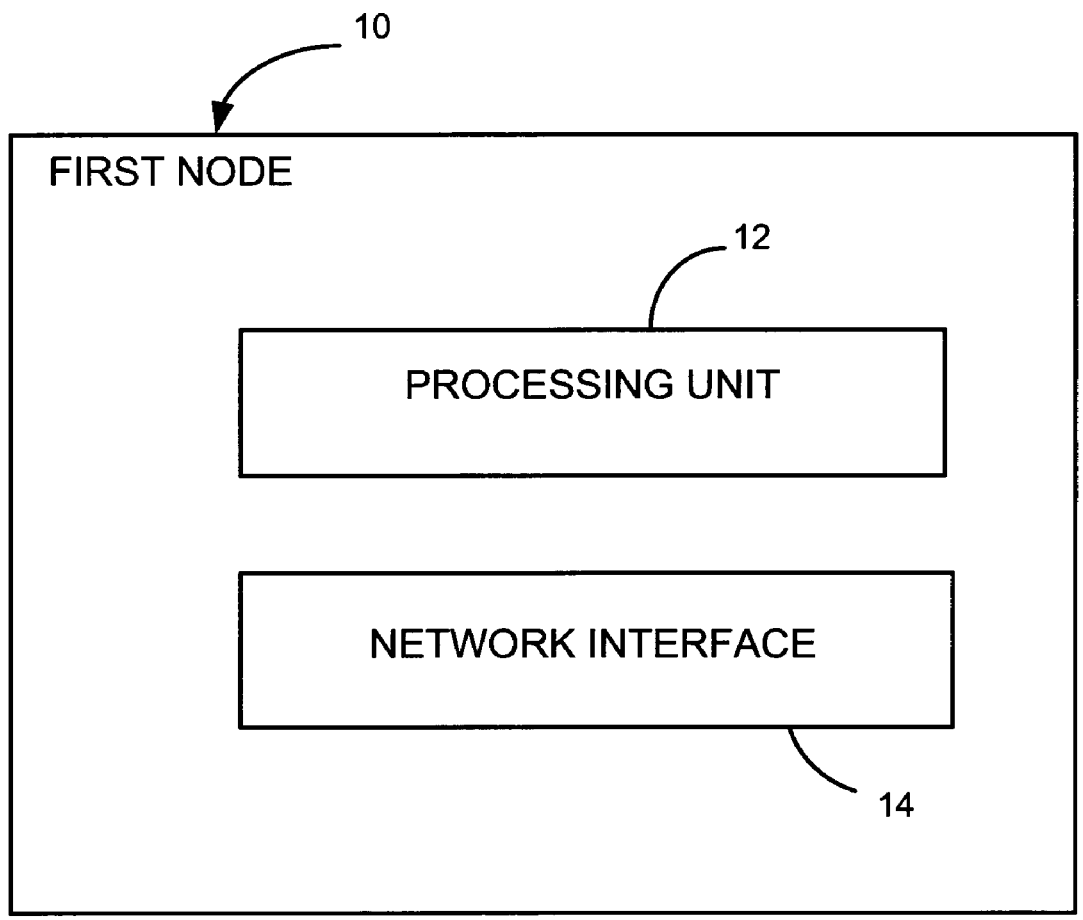
FIG. 3 is a block diagram of a first node of the present invention.

Referring now to the drawings wherein like reference numerals refer to similar or identical parts throughout the several views, and more specifically to FIG. 3 thereof, there is shown a first node 10 of conveying transport block size (TBS) information in a control message to a second node 16. The control message contains information describing properties of an associated wireless data transmission between the first and the second node 16 employing spatial multiplexing for sending transport blocks in the wireless data transmission. The first node 10 comprises a processing unit 12 which determines TBS parameters to be included in the control message to the second node 16, and encodes the control message. The first node 10 comprises a network interface 14 which sends the control message to the second node 16, and sends the transport block in the wireless data transmission according to the TBS parameters in the control message.

The processing unit 12 can indicate the use of a certain TBS table and can indicate a TBS value by pointing to an entry in the indicated TBS table. The processing unit 12 can indicate transmission of a transport block on the associated wireless data transmission using a first number of layers and wherein the certain TBS table is associated with a second number of layers. In a first embodiment, the second number of layers is equal to two.

The certain TBS table can be indicated using a separate bit field indicating which TBS table out of a set of TBS tables to use. The certain TBS table can be indicated using a TBS table indicator which is jointly encoded with precoder related information in a precoder related information field. The TBS value can be indicated using a TBS value indicator whose interpretation is affected by the value of the precoder related information field. The TBS value indicator can affect the interpretation of the precoder related information field. The certain TBS table can be indicated by signalling that it corresponds to the certain TBS table being used for a previous transmission of the same transport block.

Figure 4:
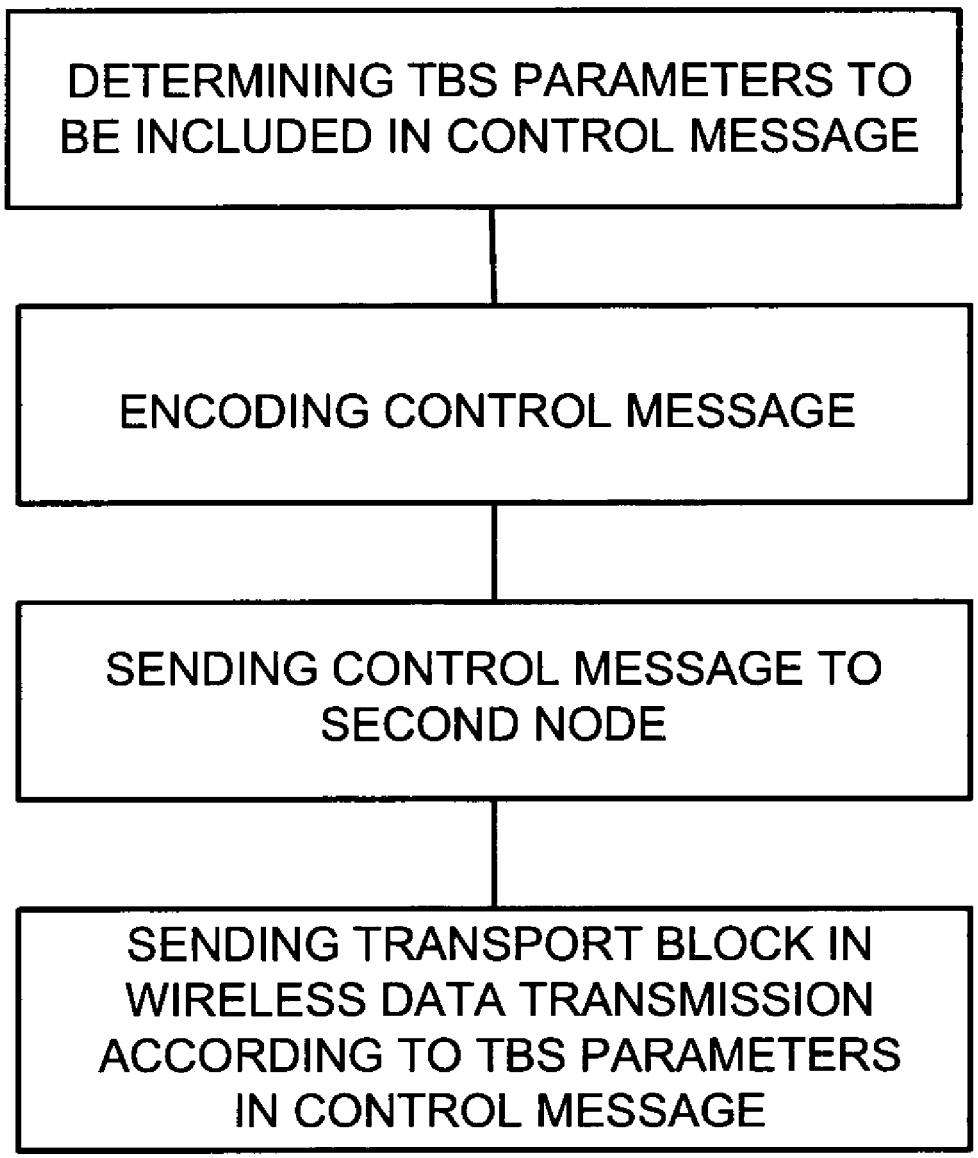
FIG. 4 is a flow chart of a method of the present invention.

The present invention pertains to a method in a first node 10 of conveying transport block size (TBS) information in a control message to a second node 16, as shown in FIG. 4. The control message contains information describing properties of an associated wireless data transmission between the first and the second node 16 employing spatial multiplexing for sending transport blocks in the wireless data transmission. The method comprises the steps of determining TBS parameters to be included in the control message to the second node 16. There is the step of encoding the control message. There is the step of sending the control message to the second node 16. There is the step of sending the transport block in the wireless data transmission according to the TBS parameters in the control message.

The determining step can include the steps of indicating the use of a certain TBS table and indicating a TBS value by pointing to an entry in the indicated TBS table. The step of determining TBS parameters can further comprise indicating transmission of a transport block on the associated wireless data transmission using a first number of layers and wherein the certain TBS table is associated with a second number of layers. In one embodiment, the second number of layers is equal to two.

The certain TBS table can be indicated using a separate bit field indicating which TBS table out of a set of TBS tables to use. The certain TBS table can be indicated using a TBS table indicator which is jointly encoded with precoder related information in a precoder related information field. The TBS value can be indicated using a TBS value indicator whose interpretation is affected by the value of the precoder related information field. The TBS value indicator can affect the interpretation of the precoder related information field. The certain TBS table can be indicated by signalling that it corresponds to the certain TBS table being used for a previous transmission of the same transport block.

Figure 6:
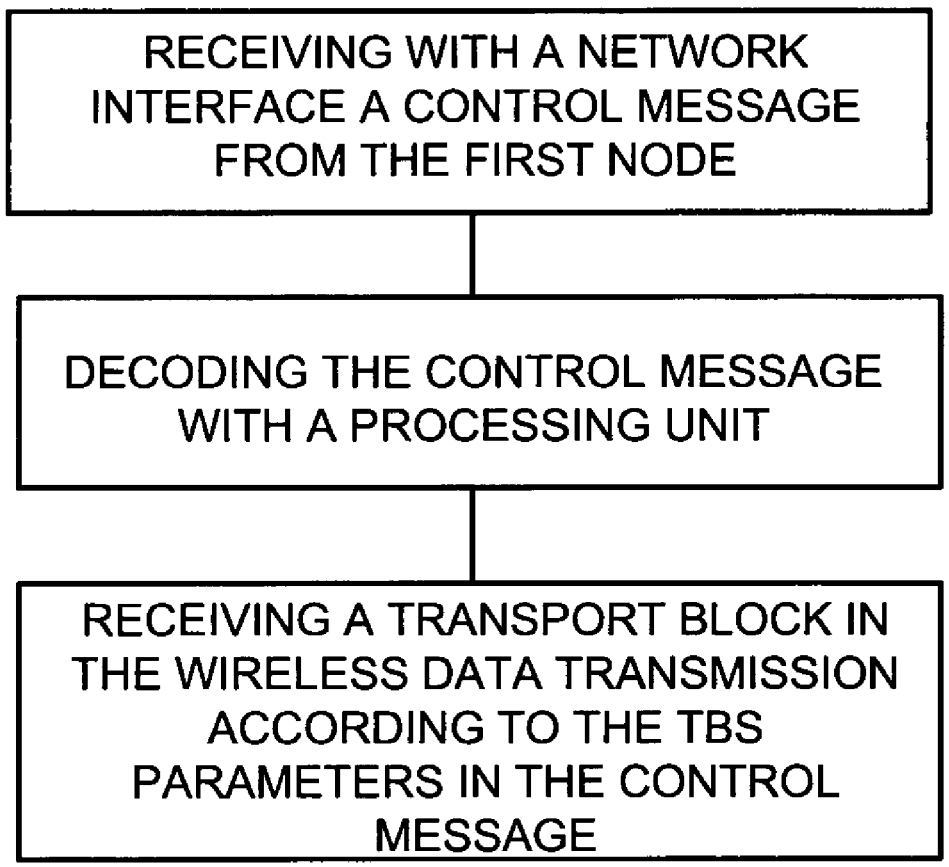
FIG. 6 is a flow chart of a method of the present invention.

The present invention pertains to a method in a second node 16 of receiving transport block size (TBS) information in a control message from a first node 10, as shown in FIG. 6. The control message contains information describing properties of an associated wireless data transmission between the first node 10 and the second node 16 employing spatial multiplexing for receiving transport blocks in said wireless data transmission. The method comprises the steps of a network interface 14 receiving said control message from the first node 10. There is the step of decoding said control message with a processing unit 12. There is the step of receiving said transport block in said wireless data transmission according to said TBS parameters in said control message.

The receiving the control message step may include the step of receiving the control message that identifies a TBS table to be used for transmission of the transport block where the transport block is not mapped to a same number of layers as a number of layers the TBS table is targeting. The receiving step may include the step of receiving the message which indicates which entry in the table to use for the transmission.

Figure 5:
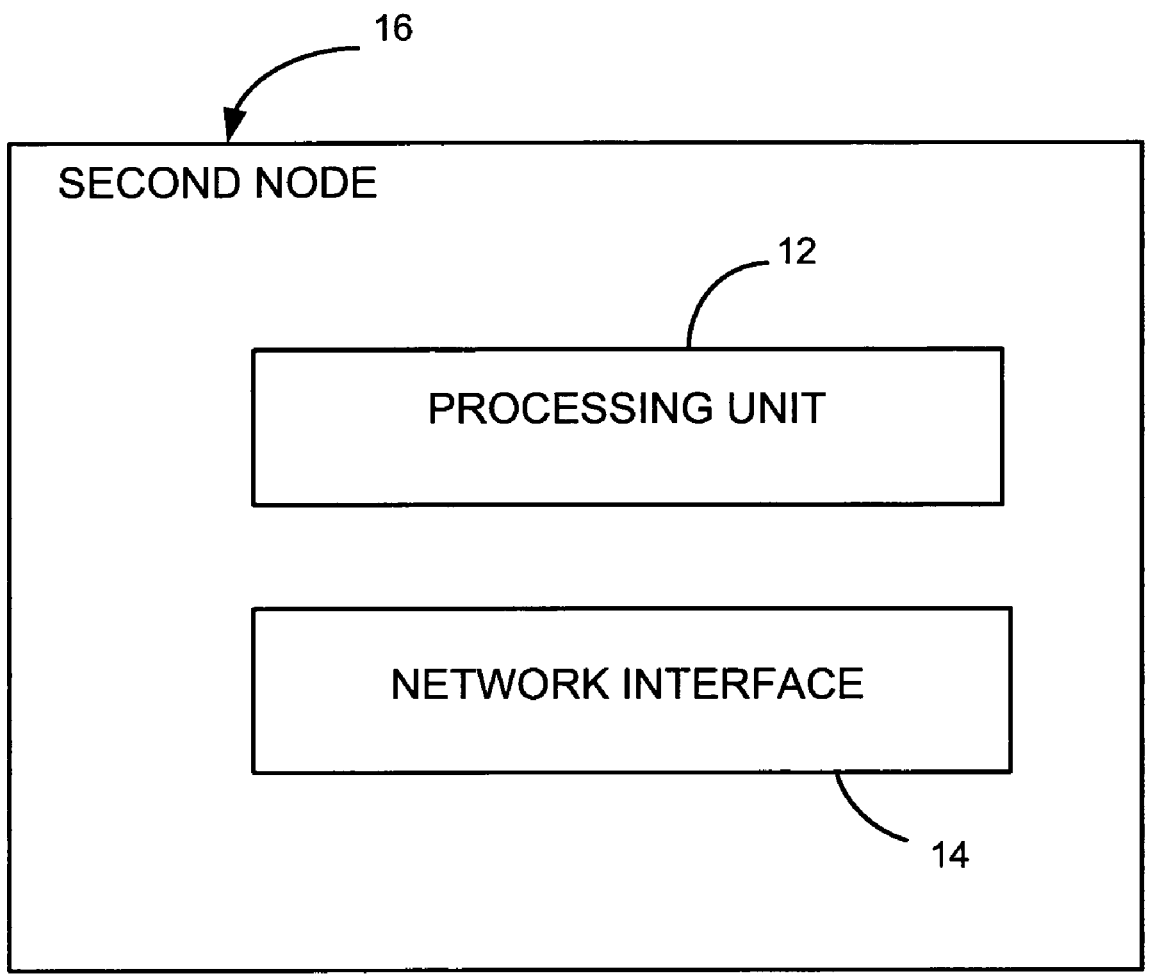
FIG. 5 is a block diagram of a second node of the present invention.

The present invention pertains to a second node 16, as shown in FIG. 5, which receives transport block size (TBS) information in a control message from a first node 10. The control message contains information describing properties of an associated wireless data transmission between the first node 10 and the second node 16 employing spatial multiplexing for receiving transport blocks in said wireless data transmission. The second node 16 comprises a network interface 14 which receives said control message from the first node 10 and said transport block in said wireless data transmission according to said TBS parameters in said control message. The second node 16 comprises a processing unit 12 which decodes said control message.

The network interface may receive the control message that identifies a TBS table to be used for transmission of the transport block where the transport block is not mapped to a same number of layers as a number of layers the TBS table is targeting. The network interface may receive the message which indicates which entry in the table to use for the transmission.

In the operation of the invention, a basic concept of the invention is to mitigate the aforementioned problems of present solutions by introducing signaling in the forward link that informs the receiver of which TBS table (out of several number-of-layers specific tables) is used for the transmission of a certain transport block, a transport block which is not necessarily mapped to the same number of layers as the number of layers the selected TBS table is targeting. At the same time, the receiver is informed about which entry in this selected table to use. The invention thereby provides an improved mechanism for retransmitting a transport block using a different number of layers than for a previous transmission attempt.

The proposed signaling furthermore determines how to interpret the fields in the forward link control channel describing the TBS value and resource allocation. In addition, encoding the signaling together with precoder related information means the precoder related information fields determine the interpretation of the TBS/MCS and resource allocation fields of the forward link control channel (PDCCH in LTE). Combined with the joint precoder encoding exemplified by Table 2, the invention therefore implies that the TBS values determine the interpretation of the precoder information fields while at the same time the precoder information fields determine the interpretation of the TBS values.

Note that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

Also note that terminology such as base station and UE should be considering non-limiting and does in particular not imply a certain hierarchical relation between the two; in general "base station" could be considered as device 1 and "UE" device 2, and these two devices communicate with each other over some radio channel.

As exemplary embodiments, this section illustrates how the signaling of number-of-layers-specific TBS table can be implemented in the PDCCH of LTE.

Note that each entry in the TBS table not only corresponds to a certain number of information bits in the transport block but also gives information about the size of the resource allocation (i.e., number of RBs), modulation and ultimately also about the number of coded bits. Each entry therefore also gives information about which coding rate is used. Naturally, if a TBS table with fewer layers is used, the coding rate increases if all other parameters are held fixed.

Separate Bit Field

A separate bit field can be introduced that signals which TBS table to use, regardless of the number of layers a certain transport block will be mapped to. For example, let's say there are two tables to choose from, one single-layer TBS table and a dual-layer TBS table. A single bit for TBS table selection could then be introduced:

TBS table selection indicator [1 bit]:
0=use single-layer TBS table,
1=use dual-layer TBS table This gives the transmitter complete freedom in selecting which TBS table to use, regardless of the settings of other parameters. As noted above, the TBS table selection indicator affects how the bit fields related to TBS and resource allocation should be interpreted.

Note that the TBS table selection indicator can in some cases also be considered to signal whether a single TBS table should be targeting one or two layers. The TBS values would for the dual-layer case then be twice as large as the corresponding TBS values for the single-layer case. Selecting between two different tables can in the present context be considered as a generalization of this more direct approach.

Jointly Encoded with Precoder Related Information

Another way of introducing TBS table selection is to encode it jointly with the precoder related information. This provides the possibility to offer TBS table selection on a transmission rank specific basis. Supporting TBS table selection for transmission rank 1 is the most important as it provides robustness by making it always possible to retransmit a transport block with a number of layers lower or equal to the current channel rank. Such joint encoding exploits the rank specific nature of the TBS table selection to reduce the signaling overhead.

An example of how TBS table indication can be jointly encoded with the existing joint precoder information encoding proposal is given in Table 3. As seen, TBS table selection is only supported for transmission rank 1. Obviously, retransmitting an originally transmitted dual-layer transport block using only a single layer may substantially increase the code rate during the retransmission, but that should anyway be preferred over being forced to retransmit a codeword using more layers than what the channel rank supports.

TABLE 3

PDCCH for 4 Tx MIMO. The TBS entries point out the number of codewords and determine the interpretation of the precoder information, which is jointly encoded. With one exception and unless mentioned explicitly otherwise, the TBS table used for a certain codeword is directly determined by the number of layers a codeword is mapped to.

| | Total #messages for precoding info | #messages | Message |
|---|---|---|---|
| 1 codeword: (TBS, 0) | 51 | 16 + 1 | RI = 1: PMI = 0, 1, . . . , 15<br>RI = 1: Precoder report confirmed, use the precoder indicated by the reported PMI index for each precoder report |
| | | 16 + 1 | RI = 1, use two-layer TBS table:<br>PMI = 0, 1, . . . , 15<br>RI = 1, use two-layer TBS table: Precoder report confirmed, use the precoder indicated by the reported PMI index for each precoder report |
| | | 16 + 1 | RI = 2: PMI = 0, 1, . . . , 15<br>RI = 2: Precoder report confirmed, use the precoder indicated by the reported PMI index for each precoder report |
| 2 codewords: (TBS1, TBS2) | 51 | 16 + 1 | RI = 2: PMI = 0, 1, . . . , 15<br>RI = 2: Precoder report confirmed, use the precoder indicated by the reported PMI index for each precoder report |
| | | 16 + 1 | RI = 3: PMI = 0, 1, . . . , 15<br>RI = 3: Precoder report confirmed, use the precoder indicated by the reported PMI index for each precoder report |
| | | 16 + 1 | RI = 4: PMI = 0, 1, . . . , 15<br>RI = 4: Precoder report confirmed, use the precoder indicated by the reported PMI index for each precoder report |

By means of TBS table selection indication, the invention disclosed herein proposes an efficient way to increase the flexibility in retransmitting a transport block with a different number of layers than what was used for an earlier transmission attempt. One of the key benefits is that a retransmission can always be performed and give substantial additional information to the decoding receiver, even if the channel rank has dropped below the number of layers used for an earlier transmission attempt.

In addition, transmission rank specific TBS table selection can be introduced in order to save additional overhead by prioritizing TBS table selection indication support for fewer layer transmissions and jointly encoding the information together with precoder related information.

Abbreviations

CQI—Channel Quality Indicator
LTE—Long Term Evolution
MIMO—Multiple-Input-Multiple-Output
PMI—Precoder Matrix Information
TBS—Transport Block Size Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method of conveying transport block size (TBS) information from a first node to a second node, comprising:
    determining one or more transport block size (TBS) parameters for a wireless transmission of data between a first node and a second node based on a first number of transmission layers associated with the wireless transmission, wherein the TBS parameters are to be used in decoding one or more transport blocks transmitted as part of the wireless transmission;
    generating a control message that includes a rank indicator, wherein the rank indicator indicates both the first number of transmission layers associated with the wireless transmission and the TBS parameters;
    transmitting the control message to the second node;
    transmitting at least one transport block to the second node in accordance with the TBS parameters indicated by the control message, wherein the transport block is transmitted over a first number of transmission layers; and
    retransmitting the at least one transport block to the second node in accordance with the TBS parameters indicated by the control message, wherein the transport block is retransmitted over a second number of transmission layers that differs from the first number of transmission layers.

2. The method of claim 1, wherein generating a control message indicating the TBS parameters comprises generating a control message that identifies a TBS table, wherein the TBS table comprises one or more TBS parameters.

3. The method of claim 1, wherein generating a control message indicating the TBS parameters comprises generating a control message that indicates a TBS table to be used for the wireless transmission corresponds to a TBS table used for a previous transmission of the same transport block.

4. The method of claim 1, wherein generating a control message comprises generating a control message that includes a TBS table indicator that is jointly encoded with precoder related information.

5. A first node for use in a wireless communication network, comprising:
    a processing unit operable to:
        determine one or more transport block size (TBS) parameters for a wireless transmission of data between the first node and a second node based on a first number of transmission layers associated with the wireless transmission, wherein the TBS parameters are to be used in decoding one or more transport blocks transmitted as part of the wireless transmission; and
        generate a control message that includes a rank indicator, wherein the rank indicator indicates both the first number of transmission layers associated with the wireless transmission and the TBS parameters;
    a network interface operable to:
        transmit the control message to the second node;
        transmit at least one transport block to the second node in accordance with the TBS parameters indicated by the control message, wherein the transport block is transmitted over a first number of transmission layers; and
        retransmit the at least one transport block to the second node in accordance with the TBS parameters indicated by the control message, wherein the transport block is retransmitted over a second number of transmission layers that differs from the first number of transmission layers.

6. The first node of claim 5, wherein the processing unit is operable to generate a control message indicating the TBS parameters by generating a control message that identifies a TBS table, wherein the TBS table comprises one or more TBS parameters.

7. The first node of claim 5, wherein the processing unit is operable to generate a control message indicating the TBS parameters by generating a control message that indicates a TBS table to be used for the wireless transmission corresponds to a TBS table used for a previous transmission of the same transport block.

8. The first node of claim 5, wherein the processing unit is operable to generate a control message indicating the TBS parameters by generating a control message that includes a TBS table indicator that is jointly encoded with precoder related information.

9. A method of receiving transport block size (TBS) information transmitted from a first node to a second node, comprising:
receiving a control message that includes a rank indicator, wherein the rank indicator indicates both a first number of transmission layers associated with a wireless transmission of data between a first node and a second node and one or more transport block size (TBS) parameters for the wireless transmission, wherein the TBS parameters are to be used in decoding one or more transport blocks transmitted as part of the wireless transmission;
receiving at least one transport block at the second node in accordance with the TBS parameters indicated by the control message, wherein the transport block is transmitted over a first number of transmission layers; and
receiving a retransmission of the at least one transport block at the second node in accordance with the TBS parameters indicated by the control message, wherein the transport block is retransmitted over a second number of transmission layers that differs from the first number of transmission layers.

10. The method of claim 9, wherein receiving a control message indicating the TBS parameters comprises receiving a control message that identifies a TBS table, wherein the TBS table comprises one or more TBS parameters.

11. The method of claim 9, wherein receiving a control message indicating the TBS parameters comprises receiving a control message that indicates a TBS table to be used for the wireless transmission corresponds to a TBS table used for a previous transmission of the same transport block.

12. The method according to claim 9, wherein receiving a control message indicating the TBS parameters comprises receiving a control message that includes a TBS table indicator that is jointly encoded with precoder related information.

13. A second node for use in a wireless communication network that also includes a first node, the second node comprising:
a network interface operable to:
receive a control message that includes a rank indicator, wherein the rank indicator indicates both a first number of transmission layers associated with a wireless transmission of data between a first node and a second node and one or more transport block size (TBS) parameters for the wireless transmission, wherein the TBS parameters are to be used in decoding one or more transport blocks transmitted as part of the wireless transmission;
receive at least one transport block at the second node in accordance with the TBS parameters indicated by the control message, wherein the transport block is transmitted over a first number of transmission layers; and
receive a retransmission of the at least one transport block at the second node in accordance with the TBS parameters indicated by the control message, wherein the transport block is retransmitted over a second number of transmission layers that differs from the first number of transmission layers; and
a processing unit operable to decode received transport blocks in accordance with the TBS parameters indicated by the control message.

14. The second node of claim 13, wherein the network interface is operable to receive a control message indicating the TBS parameters by receiving a control message that identifies a TBS table, wherein the TBS table comprises one or more TBS parameters.

15. The second node of claim 13, wherein the network interface is operable to receive a control message indicating the TBS parameters by receiving a control message that indicates a TBS table to be used for the wireless transmission corresponds to a TBS table used for a previous transmission of the same transport block.

16. The second node of claim 13, wherein the network interface is operable to receive a control message indicating the TBS parameters by receiving a control message that includes a TBS table indicator that is jointly encoded with precoder related information.

* * * * *

UNITED STATES PATENT AND TRADEMARK OFFICE
CERTIFICATE OF CORRECTION

PATENT NO. : 8,155,103 B2  Page 1 of 1
APPLICATION NO. : 12/991355
DATED : April 10, 2012
INVENTOR(S) : Jongren It is certified that error appears in the above-identified patent and that said Letters Patent is hereby corrected as shown below:

On the Face Page, in Field (56), under "OTHER PUBLICATIONS", in Column 2, Line 5, delete "XP050II0068" and insert -- XP050110068 --, therefor.

In Column 2, Lines 33-34, delete "proposed and is also to be found in this disclosure.", and insert -- proposed. --, therefor.

In Column 3, Line 20, before "contain", delete "in green".

Signed and Sealed this
Thirty-first Day of July, 2012

David J. Kappos
*Director of the United States Patent and Trademark Office*